July 5, 1932.     J. E. ESHBAUGH     1,866,019
AUDIBLE AIR SPEED ANNUNCIATOR
Filed June 24, 1931
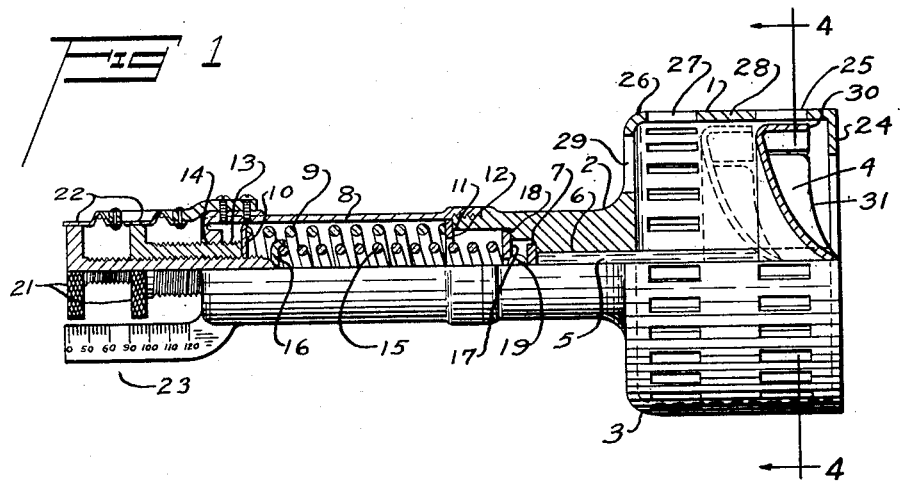
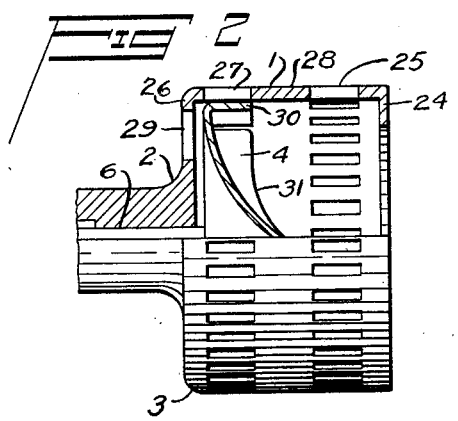
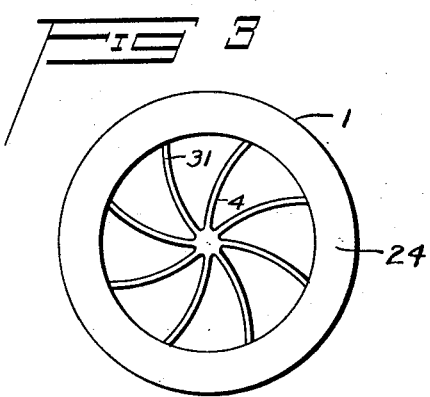
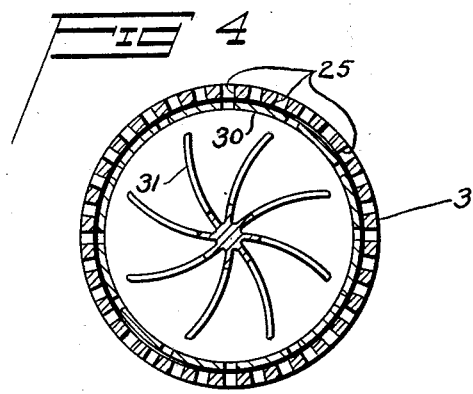
INVENTOR
JESSE E. ESHBAUGH.
BY
ATTORNEY Patented July 5, 1932

1,866,019

UNITED STATES PATENT OFFICE

JESSE E. ESHBAUGH, OF FLINT, MICHIGAN

AUDIBLE AIR SPEED ANNUNCIATOR

Application filed June 24, 1931. Serial No. 546,639.

This invention relates to aircraft and has for its object to provide a device for notifying, by audible means, the occupants of an aircraft of the upper and lower limits of a predetermined speed range.

The invention consists of the mechanism arranged and employed for utilizing the dynamic air pressure to drive and control a siren, and in certain details of construction and combination of parts, all of which will be first fully described and afterwards specifically pointed out in the appended claims.

Referring to the accompanying drawing:

Fig. 1 is a side view partly in longitudinal vertical cross-section illustrating the device in one operating position;

Fig. 2 is a view similar to Fig. 1 illustrating the rotor in a different operating position;

Fig. 3 is a front plan view of the rotor and rotor housing; and

Fig. 4 is a sectional view taken on the line 4—4 of Fig. 1.

Referring to the drawing by reference numerals:

1 indicates the siren which includes the casing 2 terminating in the shell 3.

4 indicates the rotor mounted on a shaft 5, which is rotatable and slidable within the journal 6. The inner end of said shaft terminates in a flange 7.

Disposed within the tubular portion 8 of the casing 2 is a spiral spring 9 held between two spring cups 10 and 11, the cup 11 being positioned against shoulder 12, while the cup 10 receives a tension adjusting screw 13 threaded through the end 14 of the casing.

Disposed within the spiral spring 9 is a smaller spiral spring 15 confined in two cups 16 and 17. The cup 17 is positioned against a shoulder 18, and between the said cup 17 and the flange 7 of the shaft 5 is a ball 19. Acting against the cup 16 is a tension adjusting screw 20 threaded through the first mentioned adjusting screw 13, each of said screws being of equal pitch and having notched heads 21 held by spring actuated pawls 22. Adjacent to the screw heads 21 is a calibrated scale 23 to which the screws are adjusted according to predetermined calculations. By means of this arrangement, the tension of the springs 9 and 15 can be independently adjusted.

Referring to the shell 3, the same is provided near its outer end 24 with a series of narrow slots 25 and near its base 26 with a series of similar slots 27, while between said two series of slots 25 and 27 is a blank portion 28, and in the base 26 is a series of air passages 29.

Referring to the rotor 4, the same comprises two sets of blades 30 and 31, the former of which are arranged radially and closely adjacent the shell 3, while the latter are disposed angularly to the axis of rotation of the rotor.

Having thus described the construction and arrangement of the parts of the invention, its operation is as follows:

The device is mounted on an aircraft so that the axis of the rotor will be parallel to the line of flight of the aircraft. The air pressure created by the speed of the aircraft acts upon the faces of the blades 31 revolving under the slots 25 in the casing 3 and alternately opening and closing the same to the passage of air through said slots 25 creates a series of rapid alternate compressions and rarefactions which produce a siren note.

The tension of the inner spring 15 is set so that the rotor will continue to rotate under the first series of slots 25 in the shell 3 as long as the air pressure on the rotor 4 remains within a certain predetermined limit, within which limit the rotor 4 will not move out of cooperative relation with the first series of slots 25, and the siren note will thus be continuously produced.

When, however, the speed of the aircraft is increased and the air pressure is accordingly increased beyond a predetermined limit, said air pressure on the rotor 4 overcomes the tension of the inner spring 15, and the said rotor is caused to move out of cooperative relation with the first series of slots 25 and into position shown in dotted lines in Fig. 1, in which position the siren becomes silent.

Upon further increase of speed of the aircraft and consequent increase of air pressure beyond a predetermined limit on the rotor 4, further inward movement is imparted to the rotor which causes the spring cup 17 to move the spring cup 11 and compress the outer spring 9. This further movement of the rotor 4 brings the same under the second series of slots 27, as shown in Fig. 2, thereby establishing the necessary cooperative relation between the radial blades 30 and the said slots 27 to again create a continuous siren note.

By means of this construction the tension on the rotor 4 can be regulated so that within a certain predetermined low range of speed of the air craft, a continuous siren note will be sounded, while within a certain predetermined intermediate speed range, the siren will be silent, while within a certain predetermined high speed range, a continuous siren note will again be sounded. The result is that the device furnishes an audible means by which all occupants of an aircraft are informed as to the speed of the aircraft within certain predetermined ranges, which predetermination can be changed or altered as may be desired.

Having thus fully described the invention, I do not wish to be understood as limiting myself to the exact construction herein set forth, but consider myself clearly entitled to all such changes or modifications as fall within the limit and scope of the appended claims.

What I claim as new and desire to secure by Letters Patent of the United States is:—

1. A device of the character described, including a casing having a shell, the shell being provided with two series of slots and having a blank portion intermediate the said two series of slots, a rotor and a shaft slidably mounted in said casing, said rotor including a series of blades disposed adjacent to said casing and a series of propelling blades, a spring in said casing and means for adjusting the spring to resiliently hold the said rotor in cooperative relation with the outermost series of slots in the said shell, a further spring within the casing and means for adjusting the same to resiliently hold the said rotor in position intermediate the said two series of slots in the shell, the last mentioned spring being capable of compression to permit movement of said rotor into cooperative relation with the innermost of said series of slots in the said shell.

2. A device of the character described including a casing having a shell, the shell being provided with two series of slots and having a blank portion intermediate the said two series of slots, a rotor and a shaft slidably mounted in said casing, said rotor including a series of blades disposed adjacent to said casing and a series of propelling blades, adjustable means for resiliently holding the said rotor in cooperative relation with the outermost series of slots in the said shell, further adjustable means for resiliently holding the said rotor in position intermediate the said two series of slots in the shell, the said two resiliently holding means being adapted to permit movement of said rotor into cooperative relation with the innermost of said series of slots.

3. A device of the character described including a casing having a shell, the shell being provided with two series of slots and having a blank portion intermediate the said two series of slots, a rotor and a shaft slidably mounted in said casing, said rotor including a series of propelling blades, adjustable means for resiliently holding the said rotor in cooperative relation with the outermost series of slots in the said shell, further adjustable means for resiliently holding the said rotor in position intermediate the said two series of slots in the shell, the said two resiliently holding means being adapted to permit movement of said rotor into cooperative relation with the innermost of said series of slots.

4. A device of the character described, including a casing having a shell, the shell being provided with two series of slots and having a blank portion intermediate the said two series of slots, a rotor including means to receive air-pressure for self propulsion, adjustable means for resiliently holding the said rotor in cooperative relation with the outermost series of slots, for resiliently holding the rotor in intermediate position between the said two series of slots, and permitting movement of said rotor into cooperative relation with the innermost series of slots in the casing.

5. A device of the character described, including a casing having a shell, the shell being provided with two-spaced apart series of slots, a rotor including means to receive air pressure for self propulsion, means for holding the rotor in cooperative relation with the outermost series of slots, for holding the rotor in position intermediate the said two series of slots, and for permitting movement of the said rotor into cooperative relation with the innermost series of slots.

6. A device of the character described, a casing provided with two spaced apart series of slots, a rotor including means for receiving air pressure for self propulsion, said rotor being adapted to rotate in cooperative relation with the outermost of the series of slots, and means for holding the said rotor in a position intermediate said spaced apart series of slots and for holding said rotor in cooperative relation with the innermost series of slots.

7. A device of the character described including a rotor and a shell, the rotor including means to receive air pressure for self propulsion, the shell having two spaced apart series of slots for cooperation with said rotor successively and independently, and means for holding said rotor in a position intermediate said spaced apart series of slots.

8. A device of the character described including a rotor and a shell, the shell being provided with two spaced apart series of slots, means for holding said rotor in cooperative relation with either one of the two spaced apart series of slots, and for holding the rotor out of cooperative relation with either one of the two spaced apart series of slots.

9. A device of the character described, including a shell, a rotor slidable and rotatable in the shell, the shell being provided with means for cooperating with the rotor to produce a note, means for holding the rotor in cooperative relation with the said means in the shell, and for holding the said rotor out of cooperative relation with said means in the shell to silence the device.

10. A device of the character described, including a shell and a rotor, the said shell being provided with means for cooperating with the rotor to produce a note, the said rotor being slidable within the shell, and means for holding the said rotor in and out of cooperative relation with the said means in the shell.

11. A device of the character described, including an air driven rotatable and slidable member, and means cooperating with said member to produce a note, and means for holding said member out of cooperative relation with the first mentioned means to silence the device.

12. A device of the character described, including an air driven rotatable and air shiftable member, means cooperating with said member to produce a note, and means for controlling the shift of said member out of cooperative relation with the first mentioned means.

13. An audible air speed annunciator for aircraft comprising sound producing means actuable by dynamic air pressure and means for causing the sound-producing means to be actuated only at the upper and lower limits of a predetermined speed range.

14. An audible air speed annunciator for aircraft comprising sound-producing means actuable by dynamic air pressure created by relative motion of air and annunciator, and means responsive to the dynamic air pressure for causing the sound-producing means to be actuated only at the upper and lower limits of a predetermined dynamic air speed range.

15. An audible air speed annunciator for aircraft comprising a pneumatically driven siren, the rotor of which has blades designed for both propelling the rotor and producing the characteristic sound of a siren.

In testimony whereof I affix my signature.

JESSE E. ESHBAUGH.